United States Patent
Imabayashi et al.

[11] Patent Number: 5,440,190
[45] Date of Patent: Aug. 8, 1995

[54] ULTRASONIC MOTOR

[75] Inventors: Hiroyuki Imabayashi, Sagamihara; Takanao Fujimura, Kodaira; Toshimichi Iijima, Yokohama, all of Japan

[73] Assignee: Olympus Optical Co., Ltd., Tokyo, Japan

[21] Appl. No.: 125,682

[22] Filed: Sep. 22, 1993

[30] Foreign Application Priority Data

Sep. 25, 1992 [JP] Japan .................................. 4-256803
Jan. 27, 1993 [JP] Japan .................................. 5-012022

[51] Int. Cl.⁶ ............................................ H01L 41/08
[52] U.S. Cl. ............................................ 310/323
[58] Field of Search ................................ 310/323, 325

[56]        References Cited
        U.S. PATENT DOCUMENTS

| | | | |
|---|---|---|---|
| 4,642,509 | 2/1987 | Kumada | 310/323 |
| 4,821,697 | 3/1989 | Mishiro | 310/323 |
| 4,933,590 | 6/1990 | Inoue et al. | 310/323 |
| 4,965,482 | 10/1990 | Ohnishi et al. | 310/323 |
| 4,975,614 | 12/1990 | Honda | 310/323 |
| 5,162,692 | 11/1992 | Fujimura | 310/323 |
| 5,231,325 | 7/1993 | Tamai et al. | 310/323 |
| 5,274,295 | 12/1993 | Tsukimoto et al. | 310/323 |

FOREIGN PATENT DOCUMENTS

| | | |
|---|---|---|
| 63-240380 | 10/1988 | Japan . |
| 3-11981 | 1/1991 | Japan . |
| 3-289375 | 12/1991 | Japan . |
| 4-91666 | 3/1992 | Japan . |
| 4-91668 | 3/1992 | Japan . |

*Primary Examiner*—Mark O. Budd
*Attorney, Agent, or Firm*—Louis Weinstein

[57]        ABSTRACT

An ultrasonic motor comprising a vibrator for generating ultrasonic vibration, an electric-mechanical energy conversion element provided at node positions of the ultrasonic vibration, for generating ultrasonic vibration on the vibrator, the vibrator having an end face thereof which is inclined with respect to a central axis of the vibrator being rotatably driven by electric energy applied to the electric-mechanical energy conversion element, a plurality of displacement enlarging vibration pieces which are formed axially on the end face of the ultrasonic vibrator and in which grooves concentric with an outer periphery are arranged respectively at the node positions of the vibration, the displacement enlarging vibrating piece having a taper, and an element to be driven urged against end faces of the displacement enlarging vibration pieces by urging means and moved in a predetermined direction.

22 Claims, 9 Drawing Sheets

FIG.2(b) FIG.2(a)
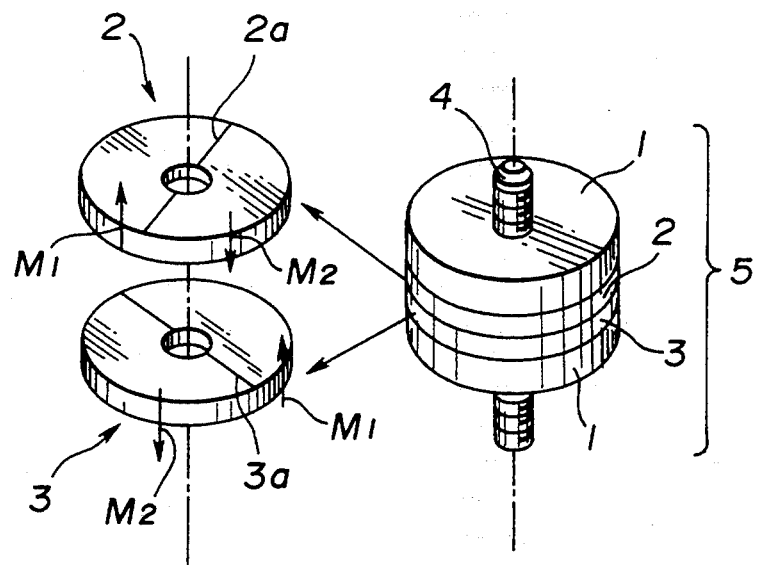
FIG.3
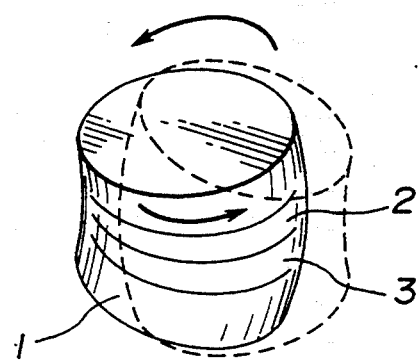

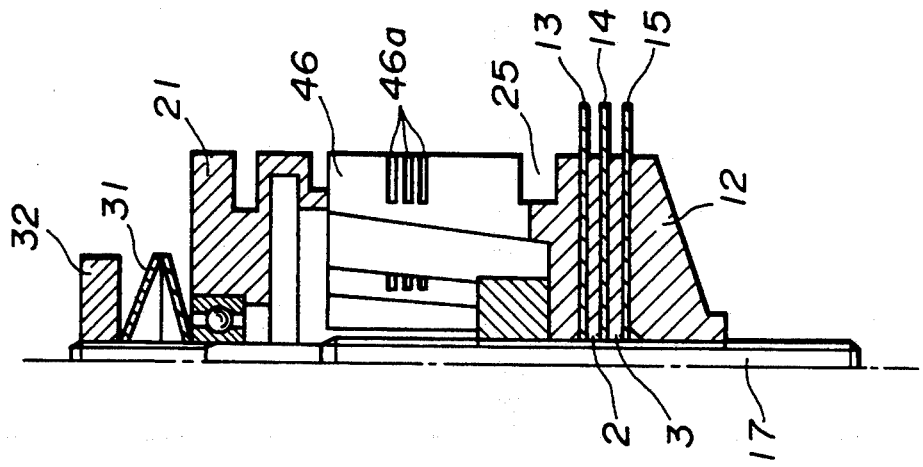
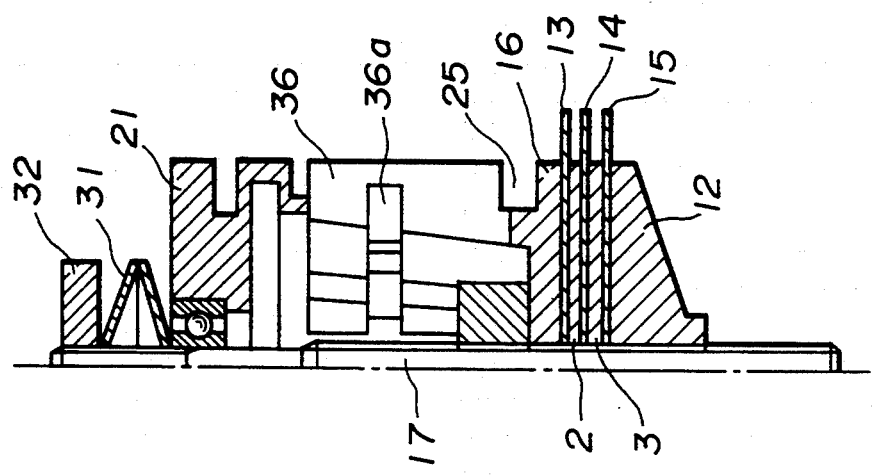

FIG.16(a)
FIG. 16(b)
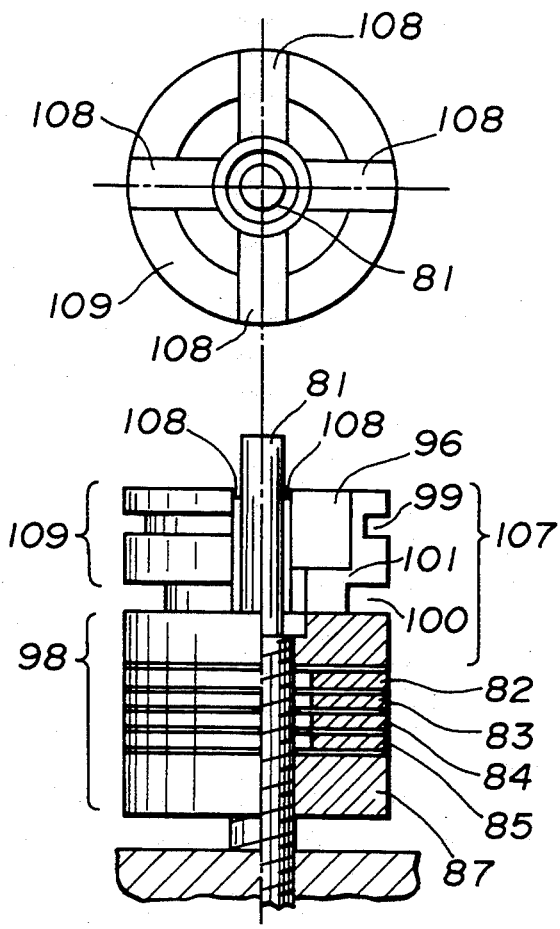
FIG.17
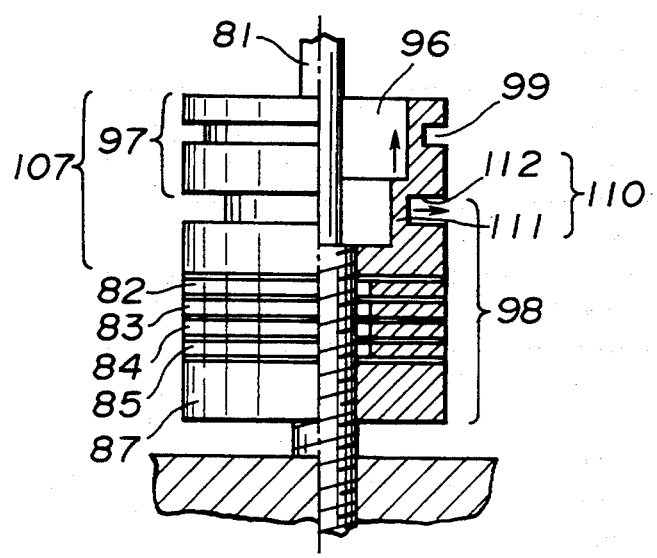
FIG.18
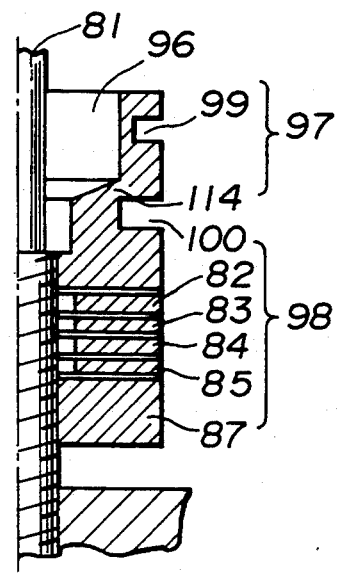

ULTRASONIC MOTOR

BACKGROUND OF THE INVENTION

1. Field of the Invention

The present invention relates to ultrasonic motors and, more particularly, to an ultrasonic motor rotated by the utilization of oscillation or vibration which is generated by vibration generating means.

2. Related Art And Prior Art Statement

Conventionally, various technical means have been proposed for improving efficiency of an ultrasonic motor to stabilize driving. For example, as shown in FIG. 11, technical means in which a vibrator 201 which outward ends a1 and a2 having are thickened more than node positions of a driving vibration mode are set whereby the above-described advantages are satisfied is disclosed in Japanese Patent Laid-Open No. HEI 4-91668. That is, the vibrator 201 is capable of reducing the natural frequency or frequency of vibration of the normal mode, which is generally exhibited by a vibrator whose diameter is uniform, by the fact that both the ends a1 and a2 which are further outside than the node position of the vibration are relatively thickened in diameter as compared with a central portion of the vibrator 201. Further, a modal mass is considerably increased to thereby be capable of producing large vibration amplitude.

Moreover, technical means in which both ends of a vibrator, which are located further outside than node positions of a driving vibration mode, are highly densified to produce advantages similar to those of the aforesaid example is also proposed in Japanese Patent Laid-Open No. HEI 4-91670.

However, means in which large-diameter portions are arranged respectively at the node positions of the bending vibration so that an attempt is made to enlarge the vibration amplitude, as indicated in the conventional example is used as is very well known. However, it is generally feared or apprehended that such means results in vibrators having a large size and large mass. If an outer periphery of a portion which becomes a load mass portion increases or is enlarged with respect to an outer peripheral diameter of a piezoelectric element, that is an electric-mechanical energy conversion element, a diameter of the portion is enlarged or large-sized. Furthermore, if the portion which becomes the load mass position is lengthened axially, the whole or entire vibrator is large-sized. In a case where an ultrasonic motor is used at a portion which has sufficient room from the point of view of space, large-sizing of the vibrator does not present a problem. However, in a case where the ultrasonic motor is used in a limited or restricted space, a large-size vibrator is greatly disadvantageous. There is a case where the ultrasonic motor can not be used practically.

Further, in a case of the technical means disclosed in Japanese Patent Laid-Open No. HEI 4-91670, if the high density portion is used at the node positions of the bending vibration, an attempt can be made to miniaturize or down-size the vibrator per se. However, at least two kinds of elements are required. Moreover, there is a fear that such technical means causes an increase in assembly steps and an increase in the cost.

OBJECTS AND SUMMARY OF THE INVENTION

It is a first object of the invention to provide an ultrasonic motor which can easily perform displacement enlarging, and in which an attempt can be made to down-size the ultrasonic motor.

It is a second object of the invention to provide an ultrasonic motor which is capable of enlarging vibration amplitude to improve efficiency, and in which an attempt can be made to down-size the ultrasonic motor.

Briefly, according to the invention, there is provided an ultrasonic motor comprising a vibrator for generating ultrasonic vibration, an electro-mechanical energy conversion element provided at node positions of the ultrasonic vibration, for generating ultrasonic vibration on said vibrator, said vibrator having an end face thereof which is inclined with respect to a central axis of the vibrator being rotatably driven by electric energy applied to the electro-mechanical energy conversion element, a plurality of displacement enlarging vibration pieces which are formed axially on the end face of the ultrasonic vibrator and in which grooves concentric with an outer periphery are arranged respectively at the node positions of the vibration, the displacement enlarging vibrating piece having a taper, and an element to be driven urged against end faces of said displacement enlarging vibration pieces by urging means and moved in a predetermined direction.

These as well as other objects and advantages of the present invention will become further apparent from the following detailed explanation.

BRIEF DESCRIPTION OF THE DRAWINGS

FIGS. 2(a) and 2(b) are enlarged perspective views of a principal portion, showing a conceptional arrangement of a general vibration generating section;

FIG. 3 is a perspective view showing an example of bending vibration rotary motion of the vibration generating section illustrated in FIG. 2;

FIG. 6 is a cross-sectional view showing half of an ultrasonic motor according to one modification of the first embodiment, from a central axis of the ultrasonic motor;

FIG. 7 is a cross-sectional view showing half of an ultrasonic motor according to an another modification of the first embodiment, from a central axis of the ultrasonic motor;

FIGS. 16(a) and 16(b) respectively show a top plan view of an ultrasonic vibrator in an ultrasonic motor according to a fifth embodiment of the invention, and a side elevational view showing, in cross-section, right-hand half from a central axis;

FIG. 17 is a side elevational view showing, in cross-section, a right-hand half of an ultrasonic vibrator in an ultrasonic motor according to a sixth embodiment of the invention; and FIG. 18 is a cross-sectional view showing an another example of the ultrasonic vibrator in the sixth embodiment.

DETAILED DESCRIPTION OF THE PREFERRED EMBODIMENTS

Various embodiments of the invention will hereunder be described with reference to the accompanying drawings.

Figure 1:
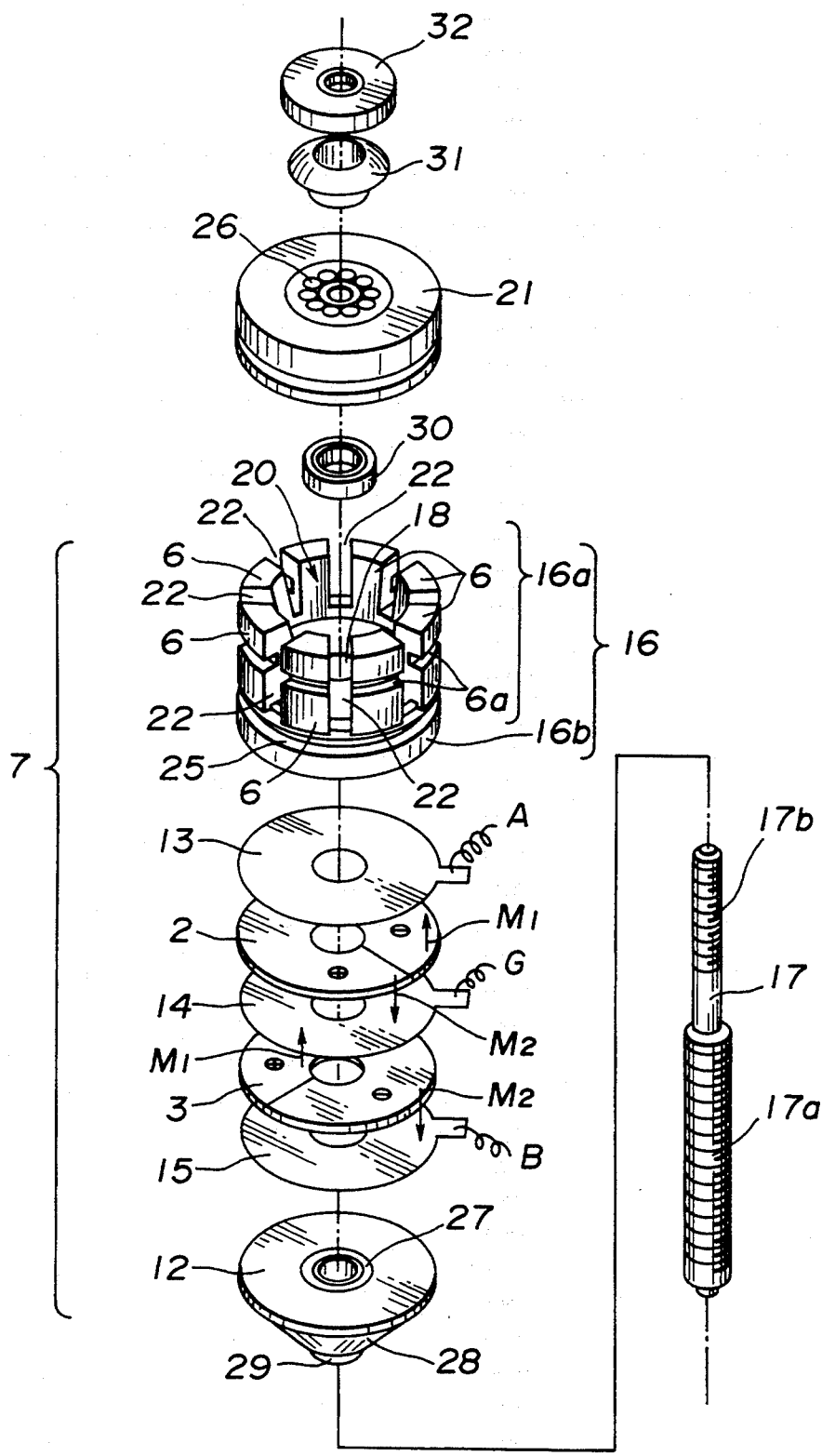
FIG. 1 is an exploded perspective view showing an arrangement of an ultrasonic motor according to a first embodiment of the invention.

FIG. 1 is an exploded perspective view showing an arrangement of an ultrasonic motor according to a first embodiment of the invention. Prior to the fact that the entire ultrasonic motor according to the first embodiment will be described, a conceptional arrangement and function of a vibration generation section in the ultrasonic motor will first be described. In this connection, in the present embodiment, a piezoelectric element in which silver vacuum deposition is applied to a voltage applying surface is used as an electric-mechanical energy conversion element.

FIGS. 2(a) and 2(b) are enlarged perspective views of a principal portion of the motor of FIG. 1, showing a conceptional arrangement of a general vibration generating section.

As shown in FIG. 2(a), an ultrasonic vibrator 5 provided with the vibration generating section comprises, as a principal portion thereof, a pair of resonators 1, 1 made of a metallic member, for example, a pair of first and second piezoelectric elements 2 and 3 arranged between the pair of resonators 1, and a fastening element 4 formed by, for example, a bolt or the like, which is so arranged as to pass through central portions of the respective resonators 1 and the respective piezoelectric elements 2 and 3 for fastening these elements together. Each of the first and second piezoelectric elements 2 and 3 presents a disc-like configuration having a hollow central portion as shown in an enlarged perspective view of FIG. 2(b) showing a polarized condition of the piezoelectric elements. The first and second piezoelectric elements 2 and 3 are each polarized in directions opposed against each other as indicated by arrows M1 and M2 in FIG. 2(b), and separated by polarizing boundary lines 2a and 3a which pass through the centers of elements 2 and 3 respectively. The first piezoelectric element 2 and the second piezoelectric element 3 are arranged in a laminated direction such that the polarizing boundary lines 2a and 3a shift 90° from each other. In this connection, the silver vacuum deposition is applied to the voltage applying surfaces of the respective piezoelectric elements 2 and 3, as described above.

Alternating voltages whose phases are shifted 90° from each other are applied to the first and second piezoelectric elements 2 and 3, whereby rotary motion of bending vibration as shown in FIG. 3 can be generated.

A plurality of such ultrasonic vibrators 5 have conventionally been proposed. However, the ultrasonic vibrators 5 are small in vibration amplitude and fall short of practicality as an ultrasonic motor, as it is. In view of this fact, in the present embodiment, a vibration piece to be described subsequently is arranged with respect to the above-described ultrasonic vibrator 5, whereby an attempt is provided to enlarge vibration of the vibrator per se. Thus, practicality is improved as an ultrasonic motor.

Figures 4A, 4B, 5A, 5B:
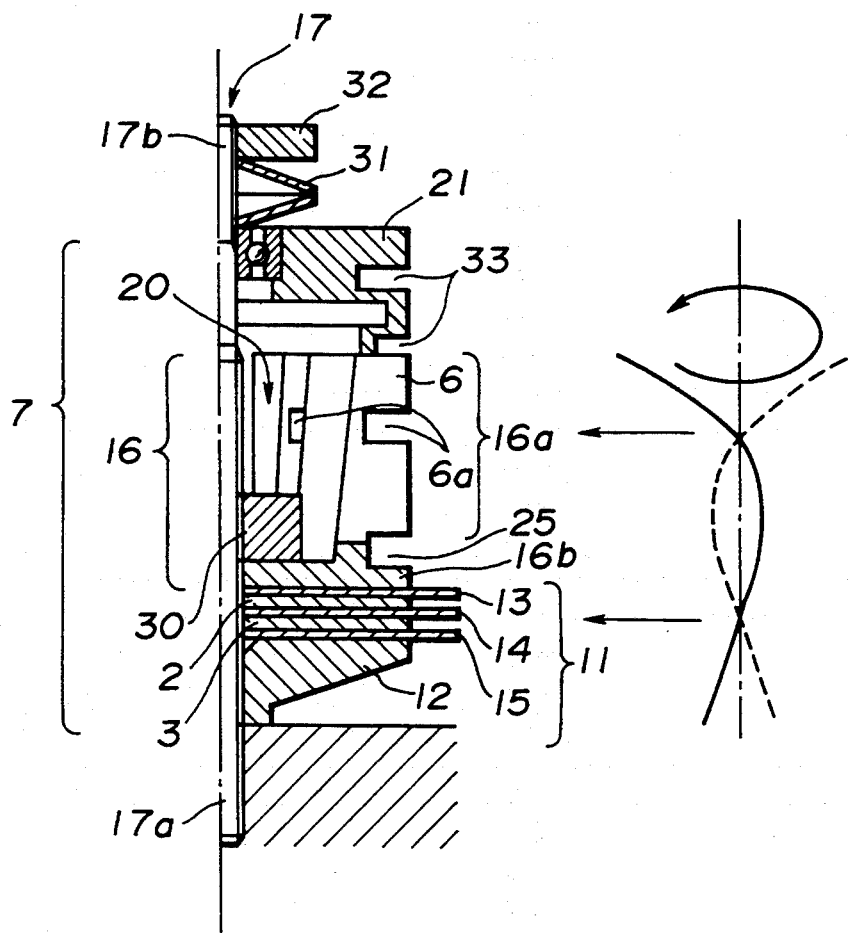
FIGS. 4(a) and 4(b) are enlarged perspective views of a principal portion, showing an ultrasonic vibrator in the first embodiment.
FIG. 5(a) is a cross-sectional view of the ultrasonic motor in the first embodiment.
FIG. 5(b) is a diagram showing a vibration mode of the ultrasonic motor.

That is, an ultrasonic vibrator 7 according to the first embodiment is arranged such that, in the ultrasonic vibrator 5 as sown in FIG. 4(a), a displacement enlarging vibration piece 6 which is inclined such that one side surface adjacent to a central axis is tapered upwardly is provided in dependence on a side edge portion at an upper surface of the resonator 1 which is arranged above in FIG. 4(a). In this connection, the other side surface of the displacement enlarging vibrating piece 6 is so formed as to be flush with an outer peripheral surface of the resonator 1. Further, only one displacement enlarging vibrating piece 6 is arranged on one side of the upper surface of the resonator 1 in FIG. 4(a). Practically, however, a plurality of such vibrating pieces each having a configuration thereof equivalent to that of the displacement enlarging vibrating piece 6 are arranged on the side edge portion of the upper surface of the resonator 1.

Furthermore, a groove 6a having a predetermined depth inward from a peripheral direction is formed at node positions of bending vibration of the ultrasonic vibrator 7 in a forward end of the displacement enlarging vibrating piece 6 coaxially with an imaginary or virtual outer peripheral surface formed by a plurality of displacement enlarging vibrating pieces 6. Moreover, positions of the first and second piezoelectric elements 2 and 3 in a vertical direction are also so arranged as to become the node positions of the bending vibration of the ultrasonic vibrator 7.

When a predetermined alternating voltage is applied to the ultrasonic vibrator 7 to concentrate vibration energy from the ultrasonic vibrator 7 at the forward end of the displacement enlarging vibration piece 6, a force coefficient of vibration (N/V) increases by the fact that the groove 6a and the piezoelectric elements 2 and 3 are arranged respectively at the node positions of the bending vibration as described above. Thus, as indicated by the vibration mode in FIG. 4(b), there can be provided a vibration force which is the most superior in efficiency with respect to the applied voltage. Further, rigidity at the node positions of the vibration is reduced by the groove 6a which is formed in the displacement enlarging vibration piece 6. Thus, there can also be produced advantages that an amount of displacement of the vibration of the ultrasonic vibrator 7 per se increases.

Next, the ultrasonic motor according to the first embodiment, to which the ultrasonic vibrator 7 having the displacement enlarging vibration piece 6 is applied will be described.

FIG. 1 is an exploded perspective view showing the arrangement of the ultrasonic motor according to the first embodiment of the invention. FIG. 5(a) is a cross-sectional view of the ultrasonic motor. FIG. 5(b) is a diagram showing a vibration mode of the ultrasonic motor.

As shown in FIGS. 1 and 5(a) and 5(b), the ultrasonic motor comprises, as a principal portion thereof, the ultrasonic vibrator 7 including the first piezoelectric element 2 and the second piezoelectric element 3 arranged respectively between three electrode plates 13, 14 and 15, a first resonator 16 and a second resonator 12 arranged such that the first and second piezoelectric elements 2 and 3 are between end surfaces of the respective first and second resonators 16 and 12, and a fastening element 17 for fastening these constitutional elements together axially, and a rotor 21 that is an element to be driven which is urged against one end surface (upper end surface) of the ultrasonic vibrator 7 and which is rotated in a predetermined direction by the ultrasonic vibration of the ultrasonic vibrator 7.

Each of the first and second piezoelectric elements 2 and 3 presents a disc configuration having a hollow circular central portion as shown in an enlarged perspective view of FIG. 2(b) showing a polarized condition of the piezoelectric elements as described above. The first and second piezoelectric elements 2 and 3 are polarized in directions opposite to each other as indicated by the arrows M1 and M2 in FIG. 2(b), separated along the polarizing boundary lines 2a and 3a which pass through respective centers thereof. The first piezoelectric element 1 and the second piezoelectric element 2 are arranged In a laminated direction such that the polarizing boundary lines 2a and 3a are shifted 90° from each other.

The electrode plates 13, 14 and 15 are electrode plates made of copper for applying voltage, each having a diameter thereof which is substantially the same in type as the first and second piezoelectric elements 2 and 3. Terminals A, G and B for soldering lead wires are provided in projection respectively on the electrode plates 13, 14 and 15, and are connected respectively to suitable power sources (not shown).

Moreover, the first and second piezoelectric elements 2 and 3, the electrode plates 13, 14 and 15 and the second resonator 12 cooperate with each other to form a vibration generating section 11.

The first resonator 16 is in the form of a hollow cylinder having a bottom 16b, and is made of material superior in vibration transfer or transmission, for example, an aluminum alloy, stainless steel, phosphor bronze, duralmin, or titanium alloy. In the present embodiment, the first resonator 16 uses material in which SUS440C is heat treated and hardness is equal to or higher than Hv800. Moreover, in the present embodiment, the first resonator 16 is made such that an oxalic-acid alumite coating is applied to an aluminum alloy, and minute bores in the alumite are filled with hydrate by steam sealing up to bottoms the thereof.

The first resonator 16 has a bottom 16b thereof whose central portion is provided with a threaded portion 18, shown in FIG. 5(a), which is threadedly engaged with a threaded portion 17a screw-threaded with the fastening element 17. The threaded portion 18 is threadedly engaged with the fastening element 17. Furthermore, an interior of the first resonator 16 above the bottom 16b is formed into a hollow portion 20 in the form of a cup which is formed with an opening at an upper end face thereof, so that vibration at the upper end face of the first resonator 16 is not restricted by the fastening element 17. Further, a plurality of vertical grooves 22 are formed in an outer peripheral side surface of an upper portion 16a of the first resonator 16 in parallel with a central axis. Thus, the upper portion 16a of the resonator is divided equally into eight (8) individual parts extending in a vertical direction to form eight (8) displacement enlarging vibration pieces 6 (refer to FIG. 4(a)). Moreover, a peripheral groove 25 extending inwardly toward a central direction is formed in the outer peripheral side surface between the upper portion 16a and the bottom 16b of the resonator. Furthermore, grooves 6a extending inwardly toward the central direction are formed respectively at positions of the displacement enlarging vibration pieces 6, which form the nodes of the bending vibration of the ultrasonic vibrator 7.

The second resonator 12 having a contact surface substantially the same in size and the same in type as the piezoelectric elements 2 and 3 is arranged the respective first and second piezoelectric elements 2 and 3 so that the electrode plates 13, 14 and 15 and the first and second piezoelectric elements 2 and 3 lie between the second resonator 12 and the first resonator 16. The second resonator 12 is formed of a material equivalent to that of the first resonator 16.

The second resonator 12 has a lower portion thereof which presents a substantially conical configuration in which a taper 28 is formed downwardly, and the substantially conical forward end is formed with a projection 29 about a central axis so that a contact surface between the projection 29 and an outer fixing portion (not shown) is reduced.

In connection with the above, electric insulating members each having a hollow circular central portion, and formed of, for example, alumina are arranged between the electrode plate 13 and the first resonator 16, and between the electrode plate 15 and the second resonator 12.

The ultrasonic vibrator 7 is assembled as follows. That is, the first and second piezoelectric elements 2 and 3, the electrode plates 13, 14 and 15 and the first and second resonators 16 and 12 are laminated upon each other as shown in FIG. 1. The fastening element 17 passes through centers of the respective first and second piezoelectric elements 2 and 3, electrode plates 13, 14 and 15 and first and second resonators 16 and 12. Epoxy adhesive is applied to locations between the constitutional elements. Subsequently, the constitutional elements are forcibly bonded or crimped together by a crimp nut 30 arranged on the fastening element 17 and the second resonator 12. The adhesive is hardened.

Meanwhile, the fastening element 17 is formed with a bolt further below the second resonator 12. The fastening element 17 crimps the ultrasonic vibrator 7 at a location above the second resonator 12, and supports the rotor 21. The fastening element 17 crimps and supports a lower end face of the ultrasonic vibrator 7 against a fixing element (not shown) at a location below the second resonator 12, to fix the ultrasonic motor.

At an upper end face of the first resonator 16, that is, at the upper end face of the ultrasonic vibrator 7, the rotor 21 which is rotated in a predetermined direction by ultrasonic vibration of the ultrasonic vibrator 7 is so arranged as to be rotatably secured to the fastening element 17 through a bearing 26. Further, a variable urging mechanism comprising a belleville spring 31 and a nut 32 which are mounted on a threaded portion 17b of the fastening element 17 is arranged on the side of the rotor 21 opposite to a contact surface between the rotor 21 and the ultrasonic vibrator 7 so that a crimping force of the rotor 21 is variable. The rotor 21 is formed by, for example, an aluminum alloy, and oxalic-acid alumite processing is applied to a surface of the rotor 21. Furthermore, a pair of thin-walled spring flange portions 33 are formed respectively at two locations in the vicinity of the contact portion between the rotor 21 and the ultrasonic vibrator 7. Thus, frequency of vibration of the natural mode of the contact portion of the rotor 21 is higher than the driving frequency of the ultrasonic vibrator 7.

The ultrasonic motor arranged in this manner applies sine wave voltage in the vicinity of resonance frequency to the pair of terminals A and B of the respective electrode plates 13 and 15 with 90° shifting in time, and the terminal G of the electrode plate 14 is grounded, whereby such a motion that bending vibration of a primary mode is rotated about the central axis of the ultrasonic vibrator 7 is generated on the ultrasonic vibrator 7. Thus, the rotor 21 is rotated in a predetermined direction.

Since the driving principle of the ultrasonic motor according to the first embodiment is known well, the description thereof will be omitted here.

In the present embodiment, the vibration generating section 16 (refer to FIG. 5) is formed at one end surface thereof with eight (8) displacement enlarging vibration pieces 6 in the neighborhood of positions including the electrode plates 13, 14 and 15, the first and second piezoelectric elements 2 and 3 and the second resonator 12, as described previously. A location adjacent to the central axis of the displacement enlarging vibration pieces 6 is provided with a hollow portion 20 in the form of a conical-shaped cup, as described above. Accordingly, the side surfaces of the respective displacement enlarging vibration pieces 6 adjacent to the central axis are brought to a tapered configuration. Thus, minute vibration from the vibration generating section 11 is concentrated toward the forward ends of the displacement enlarging vibration pieces 6 so that a large vibration generating force is transmitted to the rotor 21.

Further, the ultrasonic motor according to the first embodiment of the invention is vibrated as shown in a vibration mode in FIG. 5(b). The grooves 6a and the piezoelectric elements 2 and 3 are arranged respectively at positions which form the nodes of the bending vibration at two locations. The vibration obtained or produced from the vibration generating section 11 by a decrease in the rigidity and an increased action of the force coefficient is enlarged the largest or the most, as described previously. In this manner, if the grooves 6a and the hollow portion 20 in the form of a conical cup are provided in the first resonator 16, the vibration amplitude is maximized at the end surface of the ultrasonic vibrator 7 which is in contact with the rotor 21. The node positions of the bending vibration on the side of the rotor 21 approach the sides of the piezoelectric elements 2 and 3.

According to such first embodiment, the minute vibration from the vibration generating section is enlarged to large vibration amplitude at the forward free ends of the displacement enlarging vibration pieces. Moreover, the ultrasonic vibration is concentrated to the forward ends of the displacement enlarging vibration pieces. Thus, it is possible to produce high torque. It is possible to perform stable rotational motion by enlargement of the vibration amplitude. Thus, it is possible to realize an ultrasonic motor which is extremely less in rotational evenness or rotational nonuniformity. In this connection, the experimental results indicate that, in the ultrasonic vibrator according to the present embodiment, which has dimension of diameter $\phi$: 6 mm and the overall length or entire length: 8 mm, the vibration amplitude in the vicinity of the forward ends of the displacement enlarging vibration pieces is about 3 $\mu$m. The amplitude of the vibration generating section is enlarged to about 20 times.

FIG. 6 is a cross-sectional view showing half of an ultrasonic motor from a central axis thereof, that is a first modification of the above-described first embodiment.

In this modification, grooves in displacement enlarging vibration pieces which are formed to reduce rigidity at node positions are formed as grooves 36a in inner peripheral surfaces of the displacement enlarging vibration pieces 36. The remaining arrangement and function are similar to those of the first embodiment. It is possible also by the modification to produce advantages similar to those of the first embodiment.

FIG. 7 is a Cross-sectional view showing half of an ultrasonic motor from a central axis thereof, that is an another modification of the first embodiment.

The FIG. 7 modification is provided with displacement enlarging vibration pieces 46 in which the grooves 6a in the displacement enlarging vibration pieces 6 in the first embodiment are replaced by a plurality of fine (i.e. thin) grooves 46a. The remaining arrangement and function are similar to those of the first embodiment.

According to the present modification, the plurality of grooves in the displacement enlarging vibration pieces which are formed in order to reduce the rigidity at the node positions, are provided more finely. Accordingly, Since the rigidity slightly increases with respect to the first embodiment, it is possible to provide a low-speed, high-torque ultrasonic motor.

Figure 8:
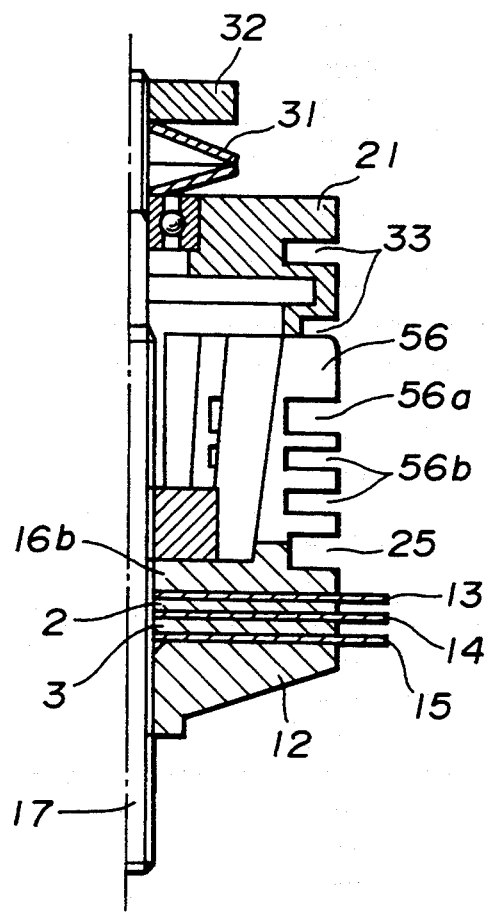
FIG. 8 is a cross-sectional view showing half of an ultrasonic motor according to a second embodiment of the invention, from a central axis of the ultrasonic motor.

FIG. 8 is a cross-sectional view showing half of an ultrasonic motor from a central axis thereof, according to a second embodiment of the invention.

The second embodiment is so arranged as to alter or modify the displacement enlarging vibration piece in the first embodiment. The remaining arrangement and function are similar to those of the first embodiment, and the description here will be omitted.

Each of the displacement enlarging vibration pieces 56 in the second embodiment basically presents a configuration similar to those of the displacement enlarging vibration pieces 6 in the first embodiment. However, the displacement enlarging vibration pieces 56 form a configuration similar to that of the groove 6a in the displacement enlarging vibration pieces 6. The displacement enlarging vibration pieces 56 are further formed with a plurality of (two in the present embodiment)

grooves 56b in the outer peripheral below grooves 56a which are arranged at similar positions. The plurality of grooves 56b are each arranged at node positions (refer to FIG. 5(b)) of the bending vibration of the ultrasonic motor, and are narrower in width than the grooves 56a.

Generally, a Langevin ultrasonic vibrator is such that heat generation is apt to occur and, particularly, internal stress is concentrated at the node positions of the bending vibration so that an amount of heat generation is maximized. Phenomenon has been confirmed that displacement is abruptly reduced by the heat generation. Accordingly, according to the present embodiment in which a plurality of grooves are provided respectively at the node positions of the bending vibration in which an amount of heat generation is the greatest, stress is dispersed so that heat generation can be suppressed. Thus, it is possible to produce stable vibration amplitude.

Moreover, if a plurality of grooves are provided in the displacement enlarging vibration pieces as in the present embodiment, the rigidity of the displacement enlarging vibration pieces is further reduced. Thus, the vibration amplitude is further greatly enlarged. Accordingly, the present embodiment is brought to an ultrasonic motor of high rotational type as compared with the first embodiment. That is, by the fact that the depth, the width and the number of grooves which are formed in the displacement enlarging vibration pieces are suitably selected, there can be provided an ultrasonic motor having various torque-number of revolutions characteristics, although the outer configurations are the same in dimension as each other. Thus, series-nization of the ultrasonic motor can easily be achieved.

Figure 9:
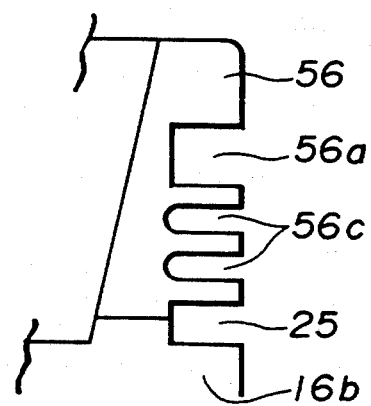
FIG. 9 is an enlarged view of a principal portion, showing a modification of a displacement enlarging vibration piece in the ultrasonic motor according to the second embodiment.

FIG. 9 is an enlarged view of a principal portion, showing a modification of the displacement enlarging vibration pieces in the ultrasonic motor according to the second embodiment.

The modification forms bottoms of grooves 56c in the displacement enlarging vibration pieces 56 into a semicircular shape or form (the reference numeral 56c) so that stress concentration which is generated at corners of the bottoms can further be reduced.

Figure 10:
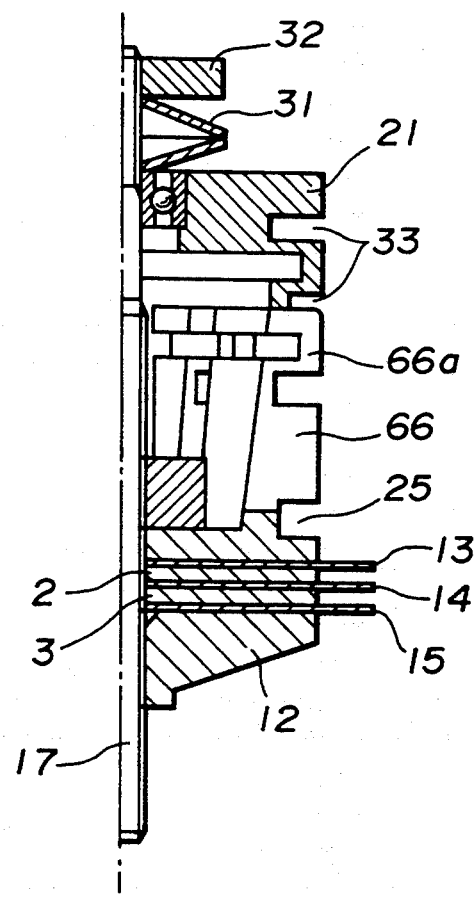
FIG. 10 is a cross-sectional view showing half of an ultrasonic motor according to a third embodiment of the invention, from a central axis of the ultrasonic motor.
Figure 11:
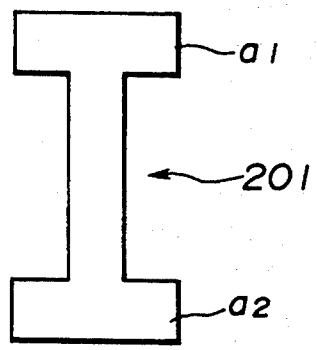
FIG. 11 is a side elevational view showing a conventional vibrator in which ends thereof located further outside than node positions of a driving vibration mode are thickened.

FIG. 10 is a cross-sectional view showing half of an ultrasonic motor from a central axis thereof, according to a third embodiment of the invention.

The third embodiment has an arrangement similar to that of the first embodiment except that a flange portion 66a having a spring property is formed in the vicinity of a contact portion between the rotor 21 and upper portions of displacement enlarging vibration pieces 66 which play a roll similar to that of the first embodiment.

The flange portion having the spring property is provided on the side of the ultrasonic vibrator like the present third embodiment, whereby the mechanical Qm of the ultrasonic vibrator can increase or can be enlarged. For this reason, it is possible to produce further large vibration amplitude at forward ends of the displacement enlarging vibration pieces 66. Furthermore, a contact surface between a rotor 21 and the ultrasonic vibrator can contact always under a constant condition (contact pressure, true contact area or the like) by two-step spring flange portions 33 formed on the side of the rotor 21 and the spring flange portions 66a on the side of the displacement enlarging vibration pieces 66, with respect to uneven or irregular "undulation or waviness" of the contact surface between the ultrasonic vibrator and the bottom of the rotor 21 at the bottom of the rotor 21.

Accordingly, it is possible to form or arrange the ultrasonic vibrator high in mechanical Qm, and it is possible to enlarge the minute vibration at the vibration generating portion efficiently. Further, the contact condition between the rotor and the ultrasonic vibrator is constant so that rotation can be made smooth.

FIGS. 12 to 15 show a fourth embodiment of the invention. In the present embodiment, piezoelectric elements in each of which a silver electrode or a nickel electrode is formed on a voltage applying surface is used as an electric-mechanical energy conversion element.

Figure 12:
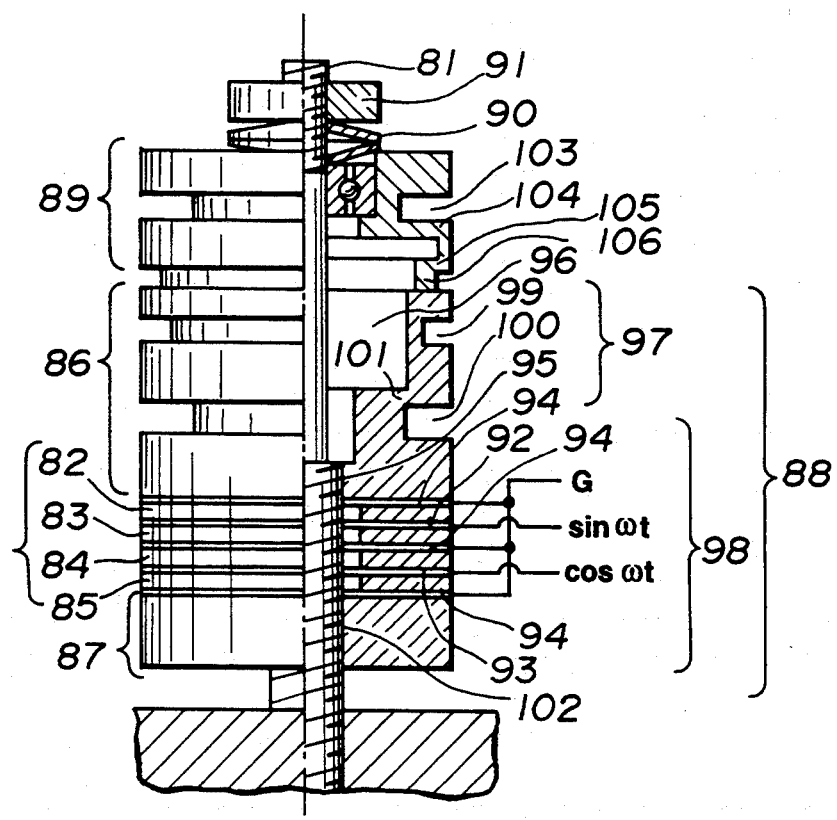
FIG. 12 is a side elevational view illustrating the whole or entire ultrasonic motor, showing, in cross-section, a right-hand portion from a central axis of the ultrasonic motor according to a fourth embodiment of the invention.
Figure 13:
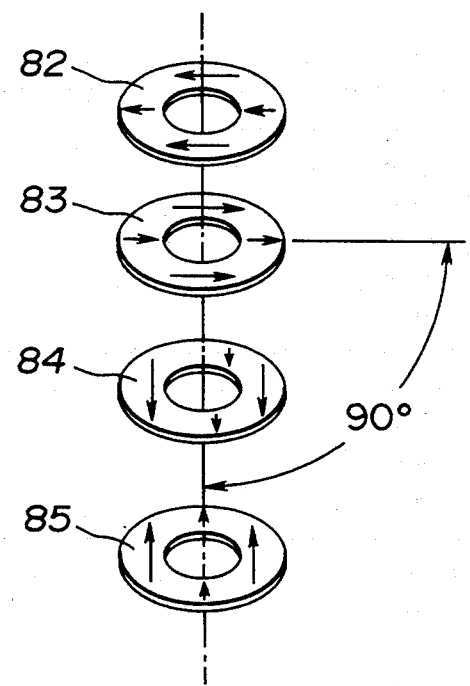
FIG. 13 is an exploded perspective view showing laminated piezoelectric elements in the fourth embodiment under a condition of being enlarged in a central axis direction.

FIG. 12 is a side elevational view showing the whole or entire ultrasonic motor whose right-hand half from a central axis is shown in cross-section. FIG. 13 is an exploded perspective view showing laminated piezoelectric elements under a condition elongated or enlarged in a direction of the central axis.

The ultrasonic motor according to the fourth embodiment has a principal portion thereof which is arranged such that a rotor 89 that is an element to be driven is threadedly engaged with an ultrasonic vibrator 88 which is formed such that first, second, third and fourth piezoelectric elements 82, 83, 84 and 85 are held between a third resonator 86 and a fourth resonator 87 with respect to a fastening element 81 forming a central axis, through a belleville spring 90 and a nut 91 such that an amount of urging is adjustable.

The first piezoelectric element 82, second piezoelectric element 83, third piezoelectric element 84 and fourth piezoelectric element 95 each in the form of a doughnut are polarized in a direction perpendicular to respective central axes thereof. The first piezoelectric element 82 and the second piezoelectric element 83 are arranged such that respective polarizing directions thereof are inverted from each other. Similarly, the third piezoelectric element 84 and the fourth piezoelectric element 85 are also arranged such that respective polarizing directions thereof are inverted from each other. Respective polarizing axes of the third piezoelectric element 84 and the fourth piezoelectric element 85 are so arranged as to be shifted in position 90° from each other with respect to the polarizing axes of the respective first and second piezoelectric elements 82 and 83.

Further, electrode plates 92, 93 and 94 made of copper are arranged respectively on end faces of the respective piezoelectric elements 82, 83, 84 and 85. Sine wave voltages (sinωt, cosωt) in the vicinity of the resonance frequency, which are shifted 90° in phase from each other, are applied respectively to the electrode plate 92 and the electrode plate 93 from a drive circuit (not shown). The electrode plate 94 is connected to GND (indicated by the reference character G in FIG. 12).

The third resonator 86 is made of material (an aluminum alloy, stainless steel, phosphor bronze, duralmin, titanium alloy or the like) which is superior in vibration transmission. In the present embodiment, material in which hard chrome plating processing is applied to SUS440C, and a surface hardness is equal to or larger than Hv800 is used. A female screw 95 in mesh with the fastening element 81 is threadedly provided on a central axis portion of the third resonator 86. A recess 96 in the form of a cup is formed such that an end face of the third resonator 86 is not in contact with the fastening element 81, toward a direction of the piezoelectric elements 82, 83, 84 and 85 from a direction brought to an end face of the ultrasonic vibrator 88. Accordingly, the neighborhood of a contact portion of the third resonator 86 with the rotor 89 is in the form of a thin-walled cylinder, to form a vibration piece 97. A portion below the vibration piece 97, that is, a lower portion of the third resonator 86, the piezoelectric elements 82, 88, 84 and 85 and the electrode plates 92, 98 and 94, and the fourth resonator 87 cooperate with each other to form a vibration generating section. Moreover, a first peripheral groove 99 and a second peripheral groove 100 each having a predetermined depth are formed in the outer peripheral surface of the third resonator 86 in concentric relation to the outer periphery thereof. At this time, a thin-walled flange portion 101 is formed at a portion connecting the second peripheral groove 100 and the peripheral surface of the third resonator 86 to each other, that is, a portion connecting the vibration piece 97 and a vibration generating section 98 to each other.

Furthermore, the fourth resonator 87 which is arranged on another one of the end faces of the respective piezoelectric elements 82, 88, 84 and 85 is also made of a material which is the same as that of the third resonator 86. A female screw 102 threadedly engaged with the fastening element 81 is threadedly provided in a central axis portion of the fourth resonator 87.

As shown in FIG. 12, the piezoelectric elements 82, 88, 84 and 85 and the electrode plates 92, 93 and 94 are arranged between the third resonator 86 and the fourth resonator 87 under a condition that the piezoelectric elements 82, 83, 84 and 85 and the electrode plates 92, 93 and 94 pass through a bolt which has a pair of threaded portions at two locations that are the fastening element 81. Epoxy adhesive is applied to locations between the constitutional elements. Subsequently, the constitutional elements are forcedly bonded or crimped together. The epoxy adhesive is hardened. In this manner, the ultrasonic vibrator 88 is formed.

The bolt 81 forcedly bonds and constitutes the ultrasonic vibrator 88, and supports the rotor 89 which has an urging mechanism on the end face of the ultrasonic vibrator 88. In the present embodiment, the urging mechanism is used which can vary an amount of forcibly bonding of the belleville spring 90 by the nut 91.

In the present embodiment, the rotor 89 is made of an aluminum alloy, and oxalic-acid alumite treatment or processing is applied to a slide element of the rotor 89. The rotor 89 has a peripheral surface and a lower portion thereof which is formed therein with peripheral groove 103. A portion of the rotor 89 adjacent to the lower surface thereof forms a flange portion 104. The rotor 89 forms a peripheral surface which is initially formed into a thin walled thickness downwardly from the flange portion 104 and, thereafter, the rotor 89 is formed with a flange portion 105 which is again directed inwardly. A lower portion of the rotor 89 is brought to a contact portion 106 with the ultrasonic vibrator 88. With such arrangement, the natural frequency or the frequency of vibration of the normal mode of the contact portion 106 of the rotor 89 is higher than the drive frequency of the ultrasonic vibrator 88.

Operation of such fourth embodiment will be described. When sine wave voltage in the vicinity of the resonance frequency in which respective phases thereof shift 90° from each other is applied to the electrode plates 92 and 98, bending vibration which is rotated about the central axis is generated on the vibration generating section 98. Accordingly, elliptic motion which is rotated about the central axis is generated on the end face of the vibrating piece 97, to rotate the rotor 89 which is urged and arranged. In this connection, if the phase differences of the drive voltage which is applied to the electrode plates 92 and 93 shift 180° from each other, elliptic motion of reversed rotation is generated on the ultrasonic vibrator 88 to reversely rotate the rotor 89.

Figure 14:
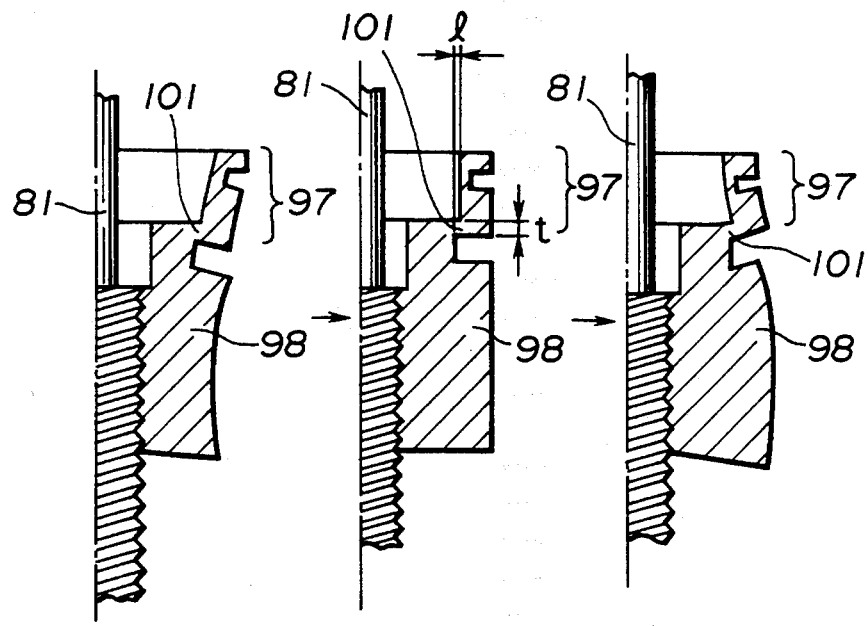
FIG. 14 is a cross-sectional view of a right-hand half of a first resonator, showing an aspect at the time the ultrasonic vibrator in the fourth embodiment vibrates in bending.

FIG. 14 is a cross-sectional view of half of the third resonator 86, showing an aspect at the time the ultrasonic vibrator 88 is vibrated in bending.

Bending vibration generated at the vibration generating section 98 is transmitted to the vibrating piece 97 through the flange portion 101. At this time, the bending vibration is transmitted to the vibrating piece 97 through the flange portion 101. At this time, the length L and the thickness t of the flange portion 101 are regulated to cause the resonance frequency of the bending vibration of the vibrating piece 97 coincident with the resonance frequency of the bending vibration of the vibration generating section 98. Since the flange portion 101 is a thin walled structure, the flange portion 101 has a spring property or characteristic, to strongly excite the vibrating piece 97. By this function or operation, the small vibration amplitude of the vibration generating section 98 is brought to an amplitude which is enlarged or magnified several tons of times, for example, in the end face of the vibrating piece 97 (that is, the contact surface between the vibrating piece 97 and the rotor 89).

Figure 15:
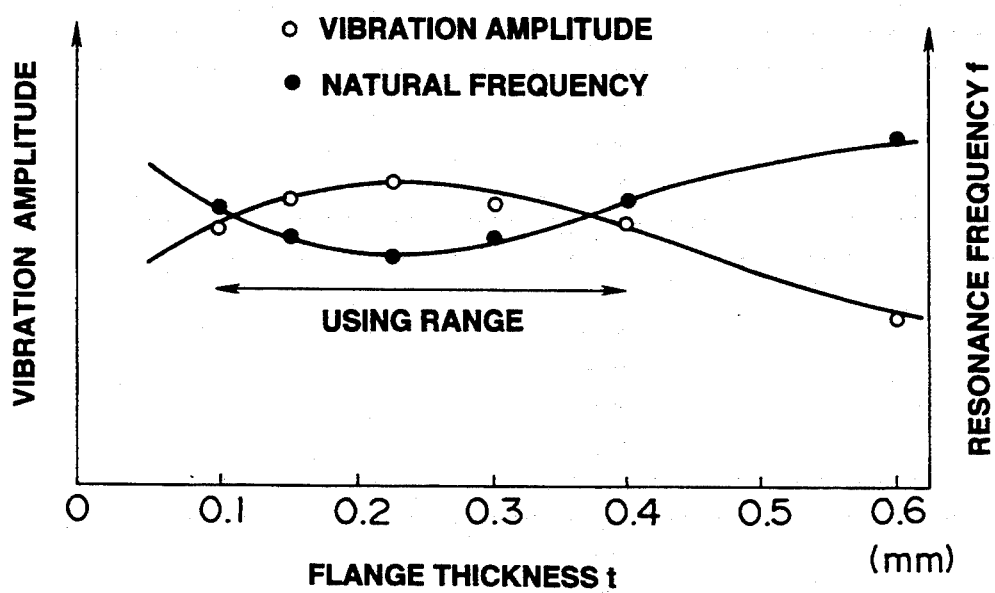
FIG. 15 is a diagram showing the relationship between thickness of a flange portion and vibration amplitude in the fourth embodiment.

FIG. 15 is a graph showing the relationship between the vibration amplitude and the thickness t of the flange portion 101 of the ultrasonic vibrator whose diameter $\phi$ is 6 mm and whose thickness is 8 mm. As shown in FIG. 15, the vibration amplitude is brought to the maximum amplitude when the thickness of the flange portion 101 is t=0.225 (mm), while, the resonance frequency is minimized at this time. In order to rotate the motor with relatively high efficiency, the thickness of the flange portion 101 should be brought to 0.1 (mm)~0.4 (mm). In this case, rotation of the rotor 89 is also stabilized. On the contrary, in a case where the thickness of the flange portion 101 is less than 0.1 (mm) or exceeds 0.4 (mm), the vibration amplitude is extremely reduced. Efficiency of the motor is reduced so that heat generation is violent.

According to such fourth embodiment, the bending vibration having large amplitude is excited on the end face of the vibrating piece 97, and it is possible to rotate the rotor 89 stably, Moreover, since the resonance frequency of the vibrating piece 97 and the resonance frequency of the vibration generating section 98 are exactly in agreement with each other, magnification or enlargement the most superior in efficiency is performed. Thus, it is possible to bring the motor to high efficiency. Furthermore, since the resonance frequency of the vibrating piece 97 depends upon the configuration of the flange portion 101, it is not required to regulate the dimension of the vibrating piece 97, and an attempt can be made to miniaturize or down-size the ultrasonic vibrator 88. In this manner, there can be provided a small-size, and highly efficient ultrasonic motor.

FIGS. 16(a) and 16(b) show a fifth embodiment of the invention. The embodiment is such that the vibrating piece 97 in the fourth embodiment is divided into four. The description of parts and elements similar to those of the fourth embodiment will be omitted, and only different portions will be described.

Similar to the fourth embodiment, a fifth resonator 107 is formed with a recess 96 in the form of a cup, and has a first peripheral groove 99, a second peripheral groove 100, and a flange portion 101. The fifth resonator 107 is formed with four (4) grooves 108 equally dividing the fifth resonator 107 into four parts peripherally thereof, Which extend from a direction in which the rotor 89 (refer to FIG. 12) is arranged, toward a direction of piezoelectric elements 82, 83, 84 and 85, which are formed in parallel with the central axis and each of which has a predetermined depth. That is, a vibrating piece 109 is divided into four portions along the peripheral direction.

Operation of the fifth embodiment arranged in this manner will be described.

Since radial motion of the vibrating piece 109 is not considerably controlled or regulated, the vibrating piece 109 vibrates largely. At this time, the fact that the configuration of the flange portion 101 is regulated, and the resonance frequency of the vibration generating section 98 and the resonance frequency of the vibrating piece 109 are in agreement with each other is similar to the fourth embodiment.

According to such fifth embodiment, there can be provided advantages substantially similar to those of the fourth embodiment. Further, since the large vibration amplitude is generated on the end face of the vibrating piece, there can be provided an ultrasonic motor of relatively high number of revolutions.

FIG. 17 shows a sixth embodiment of the invention. The sixth embodiment is arranged such that the configuration of the flange portion in the fourth embodiment is modified Accordingly, the description of portions similar to those of the fourth embodiment will be omitted, and only different portions will be described.

As shown in FIG. 17, a flange portion 110 of the sixth embodiment is formed such that a cross-sectional configuration thereof is an L-shape. That is, a thin-walled vertical flange portion 111 once rises vertically along an axial direction from a lower portion of a sixth resonator 113 and, thereafter, a thin-walled horizontal flange portion 112 is formed outwardly vertical to the axis.

In this manner, the configuration of the flange portion which is formed on the sixth resonator 113 should not be limited to a thin-walled configuration formed vertically to the axis. If the configuration of the flange portion is one in which spring characteristic is used to resonate a vibrating piece 97, it is possible to realize such function as to magnify or enlarge the vibration amplitude with respect to the flange portion having a configuration of wide range. As an arrangement having such spring characteristic, an arrangement illustrated in FIG. 18 can also be quoted, for example. In the arrangement shown in FIG. 18, a lower end surface of a flange portion is formed into a tapered configuration directed downwardly. The thinnest-walled portion is so provided as to be a single location as indicated by the reference numeral 114. The sixth embodiment is arranged such that, at this portion, the sixth embodiment has a spring characteristic.

Operation of the sixth embodiment arranged in this manner is similar to that of the fourth embodiment. However, when vibration which is generated by a vibration generating section 98 is transmitted to vibration pieces 97 (FIGS. 17 and 18) and 109 (FIG. 16(b)), the vibration is bent in both directions including a direction parallel to the central axis and in a vertical direction, by the above-described flange portions 110 and 114, and the amplitude is enlarged.

According to the sixth embodiment, even an arrangement having a configuration other than the flange portion of a thin-walled configuration can produce advantages substantially similar to those of the fourth embodiment. It is possible to enlarge the vibration amplitude, and the arrangement can be brought to an ultrasonic motor which is rotated stably.

In this invention, it is apparent that working modes different in a wide range can be formed on the basis of this invention without departing from the spirit and scope of the invention. This invention is not restricted by any specific embodiment except being limited by the appended claims.

What is claimed is:

1. An ultrasonic motor comprising:
a vibrator for generating ultrasonic vibration;
an electro-mechanical energy conversion element provided at node positions of the ultrasonic vibration, for generating ultrasonic vibration on said vibrator, said vibrator having a first face thereof engaging said energy conversion element and driving a free end remote from said end face, selectively rotatably driven in either of two opposing directions by electric energy applied to said electro-mechanical energy conversion element;
said vibrator further including a plurality of displacement enlarging vibration pieces arranged in spaced, parallel fashion and extending substantially parallel to said central axis away from said energy conversion element, said vibration pieces each having an inner and an outer periphery, one of which is provided with grooves, which are arranged respectively at node positions of the ultrasonic vibration, each displacement enlarging vibration piece having a taper; and
an element to be driven being urged against end faces of said displacement enlarging vibration pieces remote from said first face by urging means and moved in a predetermined direction, said end faces collectively defining said driving free end and being inclined relative to a central axis of the vibrator during rotation of the vibration.

2. An ultrasonic motor comprising:
a vibration generating section having an electro-mechanical energy conversion element arranged at a center of said vibration generating section, one end of said vibration generating section being rotated said one and having an end face inclined with respect to a central axis of said vibration generating section during rotation, said one end having an inclined inner face facing said central axis;
the end of said vibration generating section rotated by said electro-mechanical energy conversion element including a vibration piece extending away from said electro-mechanical energy conversion element, and having an annular groove in an outer periphery of said vibration piece and arranged at a position displaced from a securing means for securing said vibration member to said electro-mechanical energy conversion element;
a springy flange portion between said vibration piece and one end of said vibration generating section; and
an element to be driven urged against an end face of said vibration piece by urging means and moved in a predetermined direction.

3. An ultrasonic motor according to claim 1 wherein said vibrator comprises a common base member, said vibration pieces being arranged in spaced fashion about a peripheral portion of said common base member.

4. An ultrasonic motor according to claim 3 wherein the lower ends of said vibration pieces are integrally joined to said base member.

5. An ultrasonic motor according to claim 4 wherein said common base member is disk-shaped.

6. An ultrasonic motor according to claim 1 wherein said element to be driven comprises a rotor arranged to rotate about said central axis and having a central portion fixed at said central axis and means for urging said rotor toward said vibration pieces.

7. An ultrasonic motor according to claim 6 wherein said means for urging further comprises resilient means and clamping means for adjusting a force exerted by said rotor upon said vibration pieces.

8. An ultrasonic motor according to claim 6 wherein said rotor is provided with at least one springy portion arranged between a main body portion of said rotor and end faces of said vibration pieces engaging said rotor to facilitate energy transfer therebetween.

9. An ultrasonic motor according to claim 6 wherein said vibration pieces are each provided with a springy portion arranged between an engaging face of said rotor and an end face of said vibration piece engaging said rotor for improving energy transfer therebetween.

10. An ultrasonic motor according to claim 9 wherein said springy portion lies immediately adjacent one of said grooves provided in said vibration piece.

11. An ultrasonic motor according to claim 10 wherein a thickness of said springy portion measured in an axial direction is chosen to maximize vibration amplitude.

12. An ultrasonic motor according to claim 10 wherein a thickness of said spring portion measured in an axial direction is chosen to minimize natural frequency.

13. An ultrasonic motor according to claim 12 wherein said thickness lies in a range between 0.1 and 0.4 millimeters.

14. An ultrasonic motor according to claim 1 wherein outer side faces of said vibration pieces collectively form an annular-shaped periphery;
said grooves collectively forming an annular groove concentric with said annular periphery.

15. An ultrasonic motor according to claim 1 wherein inner side faces of said vibration pieces collectively form an annular-shaped inner periphery;
said grooves collectively forming an annular groove concentric with said annular inner periphery.

16. An ultrasonic motor according to claim 1 wherein said grooves collectively define an annular groove which is provided at a location which coincides with maximum heat generation of the vibration pieces.

17. An ultrasonic motor according to claim 1 wherein outer side faces of said vibration pieces collectively form an annular-shaped periphery;
said grooves collectively forming an annular groove concentric with said annular periphery, said annular grooves being closely spaced and collectively operating as a single groove of greater thickness.

18. An ultrasonic motor according to claim 1 wherein the grooves in each vibration piece have rounded bottoms to reduce stress.

19. An ultrasonic motor according to claim 1 wherein four vibration pieces are provided.

20. An ultrasonic motor according to claim 1 wherein eight vibration pieces are provided.

21. An ultrasonic motor according to claim 9 wherein said springy portion has an L-shaped cross sectional configuration.

22. An ultrasonic motor according to claim 1 wherein said element being driven and said end of the vibrator make point contact with one another during operation thereof.

* * * * *